United States Patent
Yeh

(10) Patent No.: US 9,152,187 B2
(45) Date of Patent: Oct. 6, 2015

(54) DOCKING STATION AND PORTABLE APPARATUS

(71) Applicant: PEGATRON CORPORATION, Taipei (TW)

(72) Inventor: Chun-Liang Yeh, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 267 days.

(21) Appl. No.: 13/843,009

(22) Filed: Mar. 15, 2013

(65) Prior Publication Data

US 2013/0322011 A1 Dec. 5, 2013

(30) Foreign Application Priority Data

Jun. 4, 2012 (TW) .............................. 101210742 U

(51) Int. Cl.
| | |
|---|---|
| G06F 1/16 | (2006.01) |
| H05K 5/00 | (2006.01) |
| H05K 7/00 | (2006.01) |
| E05D 7/00 | (2006.01) |
| G06F 1/18 | (2006.01) |

(52) U.S. Cl.
CPC .............. *G06F 1/181* (2013.01); *G06F 1/1632* (2013.01); *G06F 1/1669* (2013.01); *G06F 1/1681* (2013.01)

(58) Field of Classification Search
CPC ... G06F 1/1632; G06F 1/1616; G06F 1/1626; G06F 1/1656; G06F 1/166; F16M 11/10; E05B 73/0082
See application file for complete search history.

(56) References Cited

U.S. PATENT DOCUMENTS

| | | | | |
|---|---|---|---|---|
| 6,108,200 | A * | 8/2000 | Fullerton | 361/679.12 |
| 6,148,480 | A * | 11/2000 | Cooke | 16/303 |
| 6,505,382 | B1 * | 1/2003 | Lam et al. | 16/325 |
| 6,683,786 | B2 * | 1/2004 | Yin et al. | 361/679.4 |
| 7,256,988 | B2 * | 8/2007 | Shimamoto et al. | 361/679.55 |
| 7,536,749 | B2 * | 5/2009 | Lu et al. | 16/330 |
| 7,599,178 | B2 * | 10/2009 | Huang et al. | 361/679.43 |
| 7,627,930 | B2 * | 12/2009 | Duan et al. | 16/330 |
| 7,895,710 | B2 * | 3/2011 | Takagi et al. | 16/330 |
| 7,913,358 | B2 * | 3/2011 | Guo et al. | 16/330 |
| 7,952,858 | B2 | 5/2011 | Lee et al. | |
| 8,014,140 | B2 * | 9/2011 | Kitamura et al. | 361/679.27 |
| 8,205,301 | B2 * | 6/2012 | Wang et al. | 16/330 |
| 8,208,245 | B2 * | 6/2012 | Staats et al. | 361/679.02 |
| 8,259,438 | B2 * | 9/2012 | Hsiu | 361/679.01 |

(Continued)

FOREIGN PATENT DOCUMENTS

TW M424743 3/2012

*Primary Examiner* — Hoa C Nguyen
*Assistant Examiner* — Xanthia C Cunningham
(74) *Attorney, Agent, or Firm* — Muncy, Geissler, Olds & Lowe, P.C.

(57) ABSTRACT

A docking station includes a docking body and a hinge structure. The docking body includes a casing having an articulated portion and an operation interface disposed at the casing. The hinge structure is connected with the docking body vertiginously and includes a hinge assembly and a pivot portion. The hinge assembly includes a pivot, a fixed rack, a rotating rack, a first positioning cam set and a second positioning cam set. The pivot is connected with the pivot portion, while the pivot portion is articulated with the articulated portion. One end of the pivot is connected with the fixed rack. The fixed rack is connected with the docking body. The rotating rack is rotatable relative to the fixed rack and has a first spacing angle by the first positioning cam set and a second spacing angle by the second positioning cam set.

25 Claims, 12 Drawing Sheets

(56) References Cited

U.S. PATENT DOCUMENTS

| | | |
|---|---|---|
| 8,261,411 B2 * | 9/2012 | Shen .................. 16/340 |
| 8,264,835 B2 * | 9/2012 | Tang et al. ............ 361/679.43 |
| 8,797,765 B2 * | 8/2014 | Lin et al. ............. 361/807 |
| 2004/0093690 A1 * | 5/2004 | Lu et al. ............. 16/330 |
| 2004/0203994 A1 * | 10/2004 | Won et al. ........... 455/522 |
| 2005/0278895 A1 * | 12/2005 | Su .................. 16/340 |
| 2006/0112517 A1 * | 6/2006 | Luo et al. ............ 16/330 |
| 2007/0011848 A1 * | 1/2007 | Lu et al. ............. 16/340 |
| 2008/0184529 A1 * | 8/2008 | Thom ................ 16/337 |
| 2011/0069445 A1 * | 3/2011 | Haren et al. ........... 361/679.44 |
| 2012/0212900 A1 * | 8/2012 | Hung ................ 361/679.41 |
| 2013/0170131 A1 * | 7/2013 | Yen ................. 361/679.44 |

* cited by examiner

DOCKING STATION AND PORTABLE APPARATUS

CROSS REFERENCE TO RELATED APPLICATIONS

This Non-provisional application claims priority under 35 U.S.C. §119(a) on Patent Application No(s). 101210742 filed in Taiwan, Republic of China on Jun. 4, 2012, the entire contents of which are hereby incorporated by reference.

BACKGROUND OF THE INVENTION

1. Field of Invention

The present invention relates to a docking station and a portable apparatus.

2. Related Art

As the development of electronic technology, various kinds of consuming electronic products, such as notebook computers, portable players, portable game stations, PDAs, electronic dictionaries, cell phones, and the likes, are designed with smaller size for the sakes of easy carrying and conveniently usage. In order to reduce the needed storage space, the electronic products are usually configured with a hinge structure for opening or closing the display panel with respect to the main frame.

Taking a notebook computer as an example, it mainly includes a main body and a display screen, which connects with the main body via a hinge structure. When the notebook computer is not in use or is carried, the notebook computer is folded to close the display screen with respect to the main body. Otherwise, when the user wants to operate the notebook computer, he/she can unfold the notebook computer to open the display screen to a proper angle with respect to the main body via the hinge structure, and then can freely operate and use it.

However, when the display screen is opened over a certain angle, the entire notebook computer may loss its balance due to the weight of the display screen, so that the notebook computer will tend to tilt backwards.

SUMMARY OF THE INVENTION

An objective of the invention is to provide a docking station and a portable apparatus that have an auto lock function as the display screen is rotated over a certain angle, thereby preventing the tilt of the portable apparatus caused by the excess rotation angle of the screen.

To achieve the above objective, the present invention discloses a docking station, which comprises a docking body and a hinge structure. The docking body comprises an operation interface and a casing. The operation interface is disposed at the casing, and the casing has an articulated portion. The hinge structure is connected with the docking body vertiginously and comprises at least a hinge assembly and a pivot portion. The hinge assembly comprises a pivot, a fixed rack, a rotating rack, a first positioning cam set and a second positioning cam set. The pivot is connected with the pivot portion, and the pivot portion is articulated with the articulated portion. One end of the pivot is connected with the fixed rack, and the fixed rack is connected with the docking body. The rotating rack is rotatable relative to the fixed rack and has a first spacing angle by the first positioning cam set and a second spacing angle by the second positioning cam set.

To achieve the above objective, the present invention discloses a portable apparatus, which comprises a docking station and an electronic device. The docking station comprises a docking body and a hinge structure. The docking body comprises an operation interface and a casing, and the operation interface is disposed at the casing. The casing has an articulated portion. The hinge structure is connected with the docking body vertiginously and comprises at least a hinge assembly and a pivot portion. The hinge assembly comprises a pivot, a fixed rack, a rotating rack, a first positioning cam set and a second positioning cam set. The pivot is connected with the pivot portion, and the pivot portion is articulated with the articulated portion. One end of the pivot is connected with the fixed rack, and the fixed rack is connected with the docking body. The rotating rack is rotatable relative to the fixed rack and has a first spacing angle by the first positioning cam set and a second spacing angle by the second positioning cam set. The electronic device is disposed at the hinge structure and electrically connected with the operation interface.

As mentioned above, the docking station of the invention comprises a docking body and a hinge structure. The docking body comprises a casing having an articulated portion and an operation interface disposed at the casing. The hinge structure is connected with the docking body vertiginously and comprises at least a hinge assembly and a pivot portion. The hinge assembly includes a pivot, a fixed rack, a rotating rack, a first positioning cam set and a second positioning cam set. The pivot is connected with the pivot portion, while the pivot portion is articulated with the articulated portion. One end of the pivot is connected with the fixed rack. The fixed rack is connected with the docking body. The rotating rack is rotatable relative to the fixed rack and has a first spacing angle by the first positioning cam set and a second spacing angle by the second positioning cam set. Accordingly, the portable apparatus of the invention has an auto lock function as the display screen is rotated over a certain angle, thereby preventing the tilt of the portable apparatus caused by the excess rotation angle of the screen.

BRIEF DESCRIPTION OF THE DRAWINGS

The invention will become more fully understood from the detailed description and accompanying drawings, which are given for illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1A:
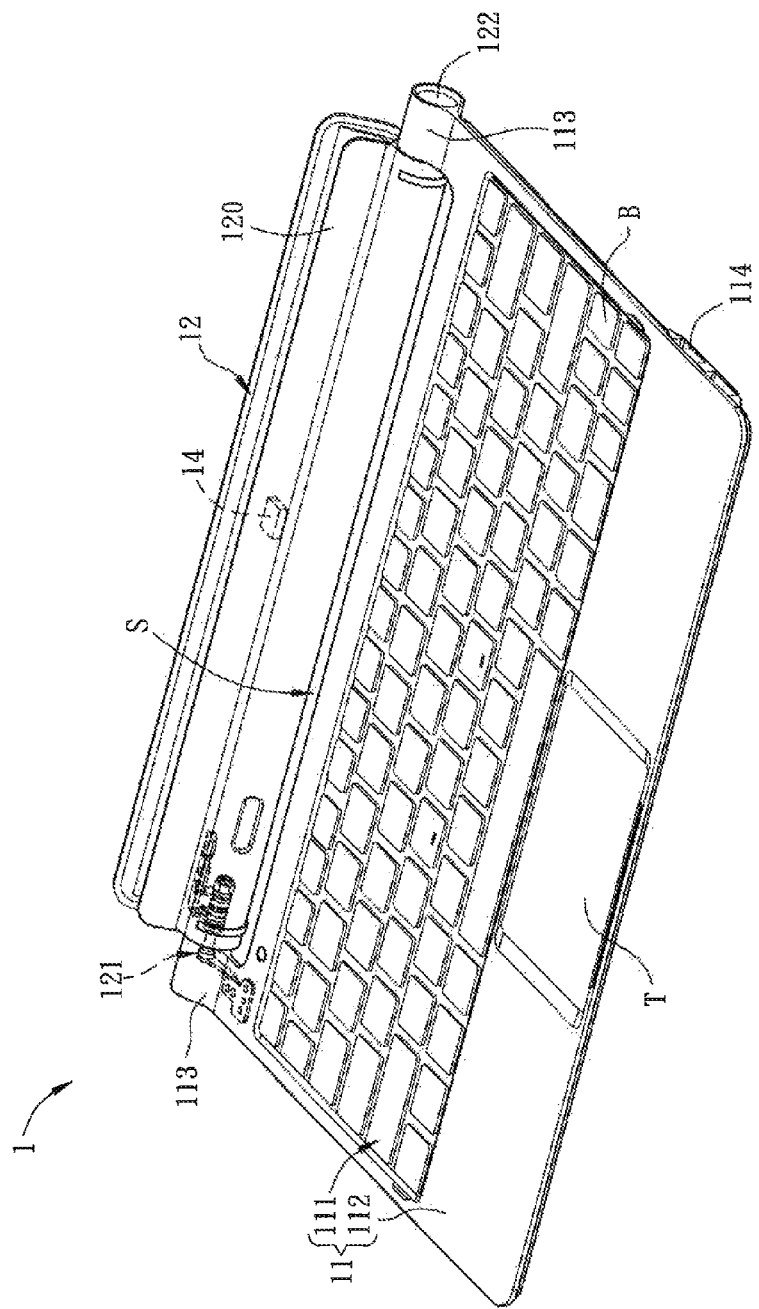
FIG. 1A is a schematic diagram of a docking station of an embodiment of the invention.

FIG. 1A is a schematic diagram of a docking station 1 of an embodiment of the invention. As shown in FIG. 1A, the docking station 1 of the invention is configured to support an electronic device.

The docking station 1 comprises a docking body 11 and a hinge structure 12.

The docking body 11 comprises an operation interface 111 and a casing 112, and the operation interface 111 is disposed at the casing 112. The casing 112 has an articulated portion 113. Herein, the operation interface 111 includes at least a button or at least a touch pad, or is a combination of a button and a touch pad. The button can be a physical button or a virtual button. In this embodiment, the operation interface 111 includes several buttons B and a touch pad T. In addition, the casing 112 has two articulated portion 113 disposed at two sides of the casing 112, respectively. The docking body 11 further comprises a plurality of connecting ports 114 for connecting with other components or apparatuses. The docking body 11 further comprises a power jack and a rechargeable battery (not shown) for providing the necessary electricity for the docking station 1.

The hinge structure 12 comprises at least a hinge assembly 121, a pivot portion 122, and a supporting member 120. As shown in FIG. 1A, the hinge assembly 121 is located inside the hinge structure 12 and is positioned at one side of the hinge structure 12. In some embodiments, the hinge assemblies 121 can be disposed at opposite two sides of the hinge structure 12, respectively. The hinge structure 12 is connected with the docking body 11 vertiginously. In other words, the hinge structure 12 is connected with the docking body 11 and is capable of rotating with respect to the docking body 11.

The supporting member 120 is connected with the pivot portion 122. In this embodiment, the supporting member 120 is mounted on the pivot portion 122, and the pivot portion 122 is articulated with the articulated portion 113. For example, the pivot portion 122 and the articulated portion 113 are integrally formed, or the pivot portion 122 and the supporting member 120 are integrally formed. If the pivot portion 122 and the articulated portion 113 are integrally formed, the pivot portion 122 is relatively rotatable with respect to the supporting member 120. Otherwise, if the pivot portion 122 and the supporting member 120 are integrally formed, the pivot portion 122 is relatively rotatable with respect to the articulated portion 113. In this embodiment, the pivot portion 122 and the articulated portion 113 are integrally formed, and the pivot portion 122 is relatively rotatable with respect to the supporting member 120.

Moreover, the supporting member 120 and the docking body 11 form a trench S therebetween, and the supporting member 120 is configured for supporting an electronic device, so that the supporting member 120 is allowed to relatively rotate with respect to the docking body in the rotation range provided by the trench S. In other words, the trench S ensures the rotation of the supporting member 120 of the hinge structure 12 without interference. The rotation angle θ (see FIG. 2A) of the supporting member 120 with respect to the docking body 11 can exceed 270 degrees. That is, the supporting member 120 of the docking station 1 of the invention is rotatable with respect to the docking body 11. In practice, the supporting member 120 is rotatable with respect to the docking body 11 via the hinge assembly 121. When the supporting member 120 is unfolded with the docking body 11, the rotation angle θ is 0 degree. In addition, when the rotation angle θ of the supporting member 120 is greater than 180 degree, the supporting member 120 is rotated to the opposite side of the operation interface 111 of the docking body 11 (or the rear side of the docking body 11).

Figure 1B:
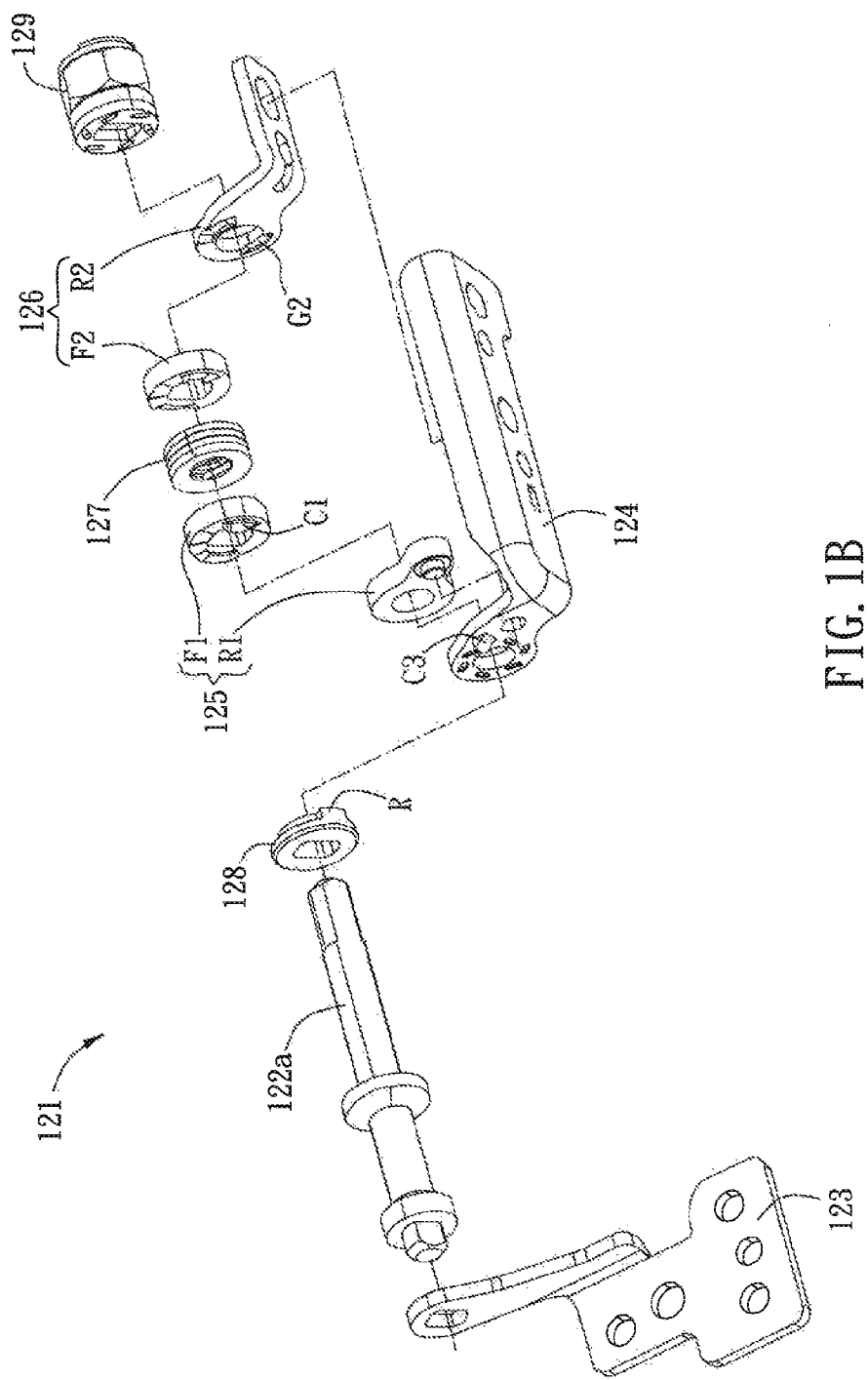
FIGS. 1B and 1C are an assembled view and an exploded view of a hinge assembly of the hinge structure.
Figure 1C:
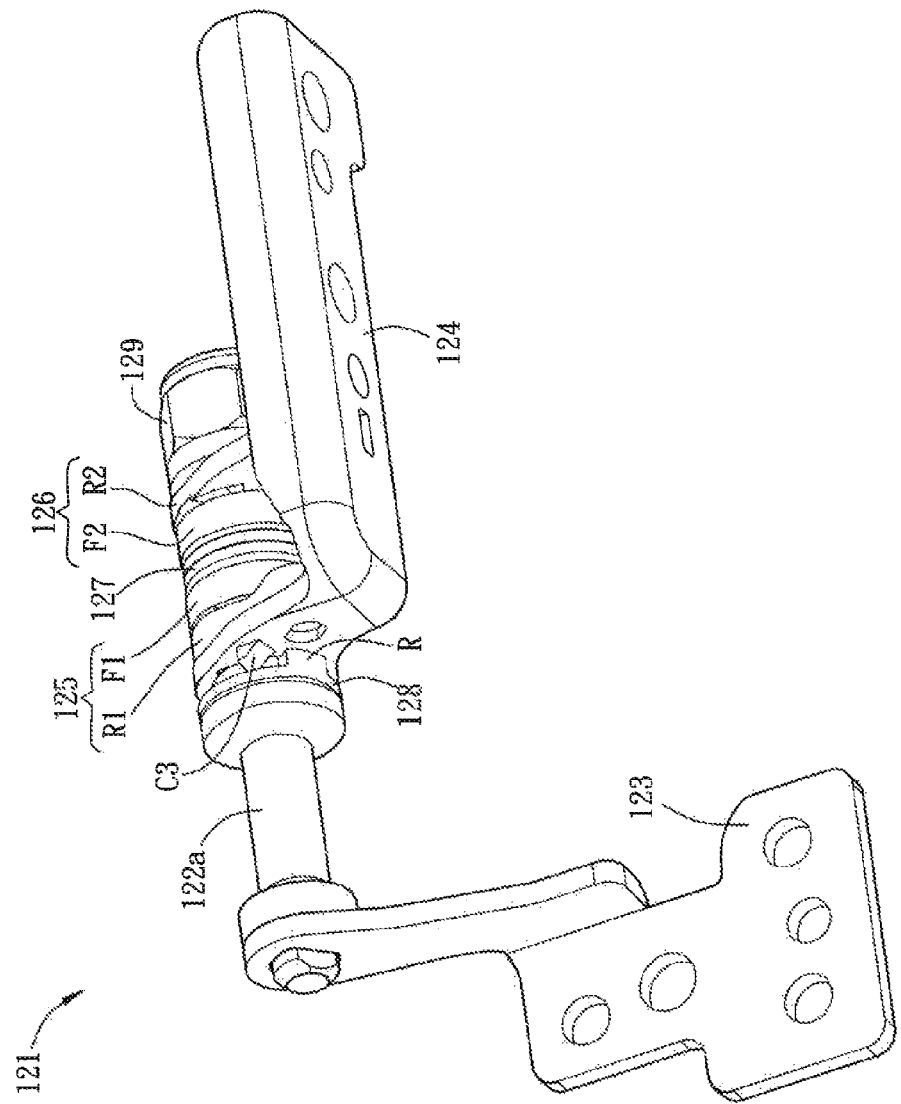
Figure 2A:
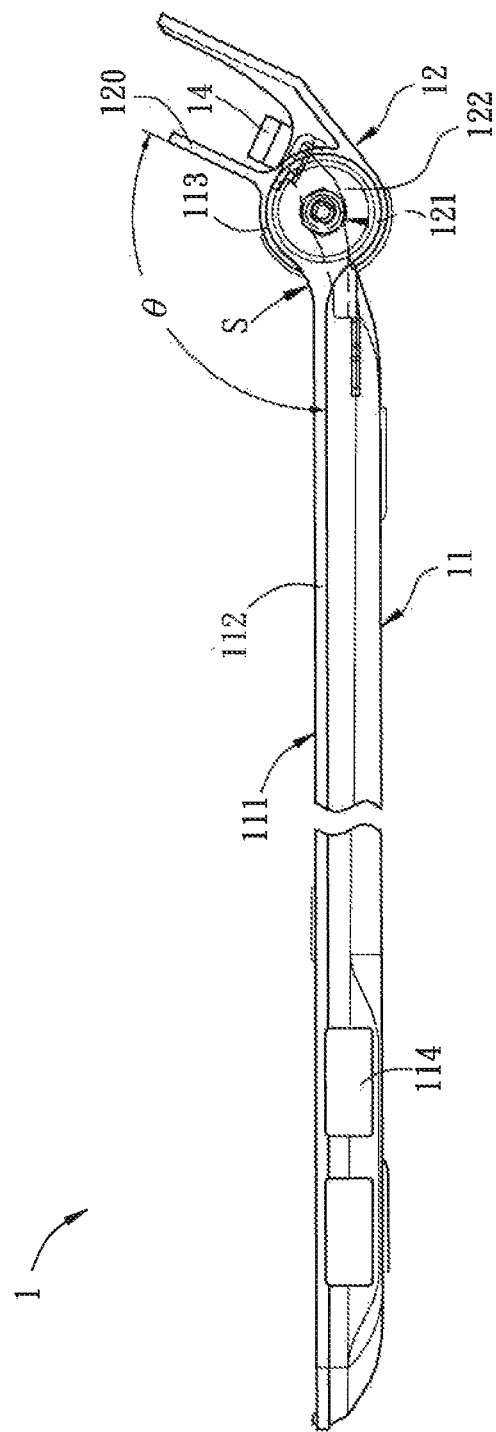
FIG. 2A is a side view of the docking station of FIG. 1A.
Figure 2B:
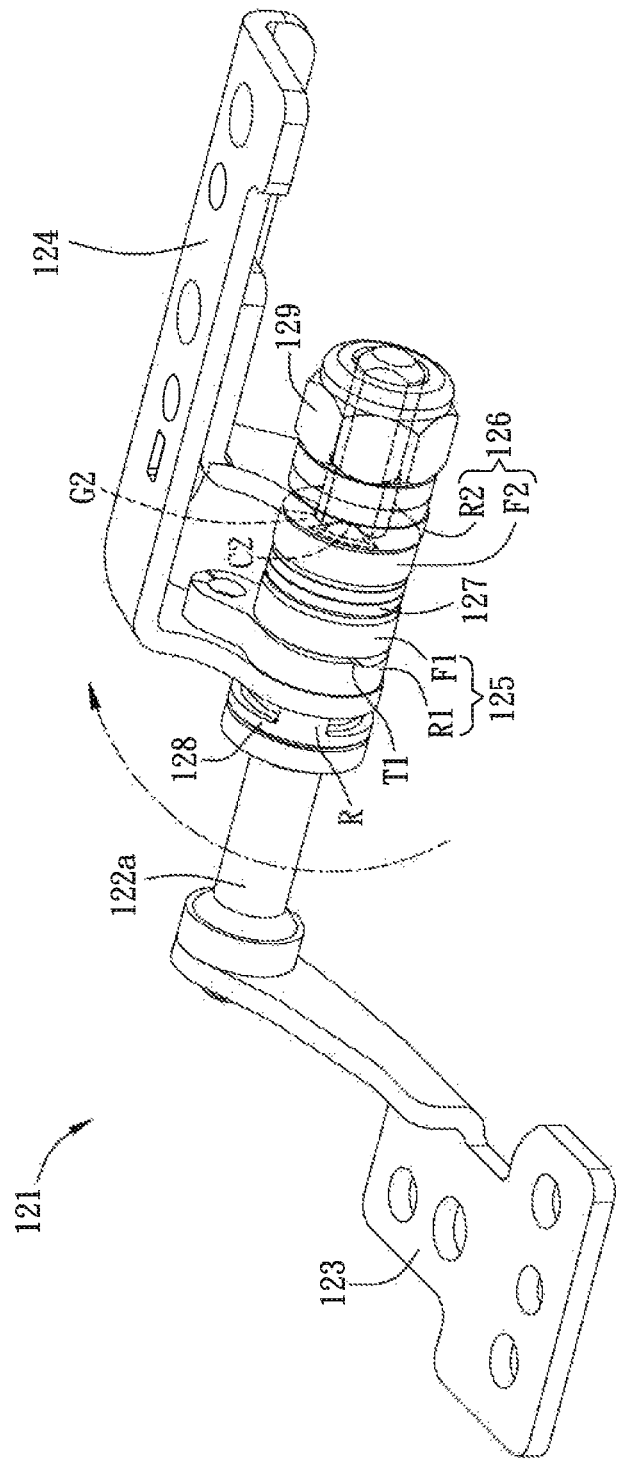
FIG. 2B is a schematic diagram of the hinge assembly of FIG. 2A.

FIGS. 1B and 1C are an assembled view and an exploded view of the hinge assembly 121, FIG. 2A is a side view of the docking station 1 of FIG. 1A, and FIG. 2B is a schematic diagram of the hinge assembly 121 of FIG. 2A.

Referring to FIGS. 1B and 1C, the hinge assembly 121 comprises a pivot 122a, a fixed rack 123, a rotating rack 124, a first positioning cam set 125, and a second positioning cam set 126. The fixed rack 123 is connected with the docking body 11, and the rotating rack 124 is connected with the supporting member 120 (not shown). The pivot 122a is coordinately connected with the pivot portion 122. The pivot portion 122 is articulated with the articulated portion 113 of the casing 112, so that the pivot 122a can be coordinately moved with the pivot portion 122. Besides, the pivot 122a is articulated with the articulated portion 113 through the pivot portion 122, so that the supporting member 120 can be rotated with respect to the docking body 11 through the hinge assembly 121 as the rotating rack 124 is rotated with respect to the fixed rack 123 through the pivot 122a.

One end of the pivot 122a is connected with the fixed rack 123, and the other end of the pivot 122a penetrates through the rotating rack 124, the first positioning cam set 125, and the second positioning cam set 126. When the rotating rack 124 is rotated relative to the fixed rack 123, it has a first spacing angle by the first positioning cam set 125 and a second spacing angle by the second positioning cam set 126.

Referring to FIGS. 1B and 1C, the first positioning cam set 125 has a first fixed portion F1 and a first rotating portion R1. The first fixed portion F1 is fastened on the pivot 122a, and the first rotating portion R1 is fastened on the rotating rack 124. Herein, the rotating rack 124 has the first spacing angle with respect to the fixed rack 123 by the concave-protrusion configuration of the first fixed portion F1 and the first rotating portion R1. In this embodiment, the first fixed portion F1 has a protrusion portion C1, and the first rotating portion R1 has a concave portion G1 (not shown in FIG. 1B) corresponding to the protrusion portion C1. When the protrusion portion C1 of the first fixed portion F1 is engaged with the concave portion G1 of the first rotating portion R1, the first spacing angle (or the rotation angle) between the rotating rack 124 and the fixed rack 123 is 0 degree so as to provide an auto lock function to the rotating rack 124 and the fixed rack 123. Herein, the "auto lock function" means that the rotating rack 124 and the fixed rack 123 are engaged by the cooperation of the concave portion G1 and the protrusion portion C1 rather than thinly fixed to each other. Thus, the user can still apply a large force to rotate the rotating rack 124 to increase the rotation angle between the rotating rack 124 and the fixed rack 123. Alternatively, the first fixed portion F1 has a concave portion G1, and the first rotating portion R1 has a corresponding protrusion portion C1. The concave portion G1 and the protrusion portion C1 can still engage with each other to provide the first spacing angle between the rotating rack 124 and the fixed rack 123. Moreover, it is possible to adjust the positions of the concave portion G1 and the protrusion portion C1 so as to change the first spacing angle.

The second positioning cam set 126 has a second fixed portion F2 and a second rotating portion R2. The second fixed portion F2 is fastened on the pivot 122a, and the second rotating portion R2 is fastened on the rotating rack 124. The rotating rack 124 has a second spacing angle with respect to the fixed rack 123 by a concave-protrusion configuration of the second fixed portion F2 and the second rotating portion R2.

Referring to FIGS. 1B and 2B, the second fixed portion F2 has a protrusion portion C2 (not shown in FIG. 1B), and the second rotating portion R2 has a concave portion G2 corresponding to the protrusion portion C2. When the protrusion portion C2 of the second fixed portion F2 is engaged with the concave portion G2 of the second rotating portion R2, the second spacing angle between the rotating rack 124 and the fixed rack 123 is 120 degrees so as to provide an auto lock function to the rotating rack 124 and the fixed rack 123. To be noted, the second spacing angle is not limited to 120 degrees, and it may be any angle between 110 and 130 degrees.

When the rotating rack 124 is rotated relative to the fixed rack 123 over 90 degrees, such as the rotation angle θ of 120 degrees (the second spacing angle) as shown in FIGS. 2A and 2B, the protrusion portion C2 of the second fixed portion F2 of the second positioning can set 126 is engaged with the concave portion G2 of the second rotating portion R2. This configuration can provide an auto lock function to the rotating rack 124 and the fixed rack 123, thereby restricting the rotation angle of the supporting member 120 (which connects to the rotating rack 144) with respect to the docking body 11 (which connects to the fixed rack 123). Of course, the user can still apply a large force to rotate the supporting member 120 to increase the rotation angle between the supporting member 120 and the docking body 11.

Referring to FIGS. 1B and 1C, the hinge assembly 121 may further include an elastic element 127 disposed between the first positioning cam set 125 and the second positioning cam set 126. In this embodiment, the elastic element 127 is an elastic metal sheet for providing an axial force between the first fixed portion F1 and the second fixed portion F2. When the first rotating portion R1 departs from the first fixed portion F1, the first fixed portion F1 compresses the metal sheet to generate an axial force, which pushes the first positioning cam set 125 against the second positioning cam set 126 tightly. This action can achieve the freely lock and auto lock functions.

The hinge assembly 121 further comprises a limiting element 128 disposed adjacent to the rotating rack 124 and fixed to the pivot 122a. Herein, the pivot 122a penetrates through the limiting element 128, and the limiting element 128 is disposed opposite to the rotating rack 124. Besides, the hinge assembly 121 may further comprise a fixing element 129 disposed at the other end of the pivot 122a and connected with the second rotating portion R2.

Figure 2C:
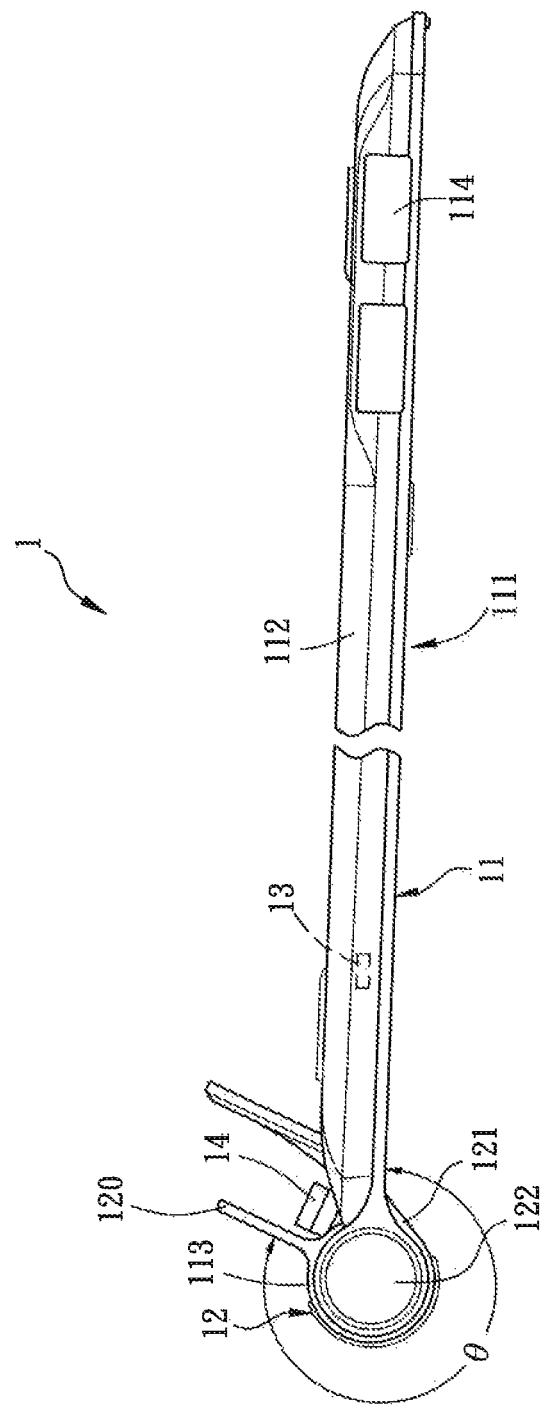
FIG. 2C is another side view of the docking station of FIG. 1A.
Figure 2D:
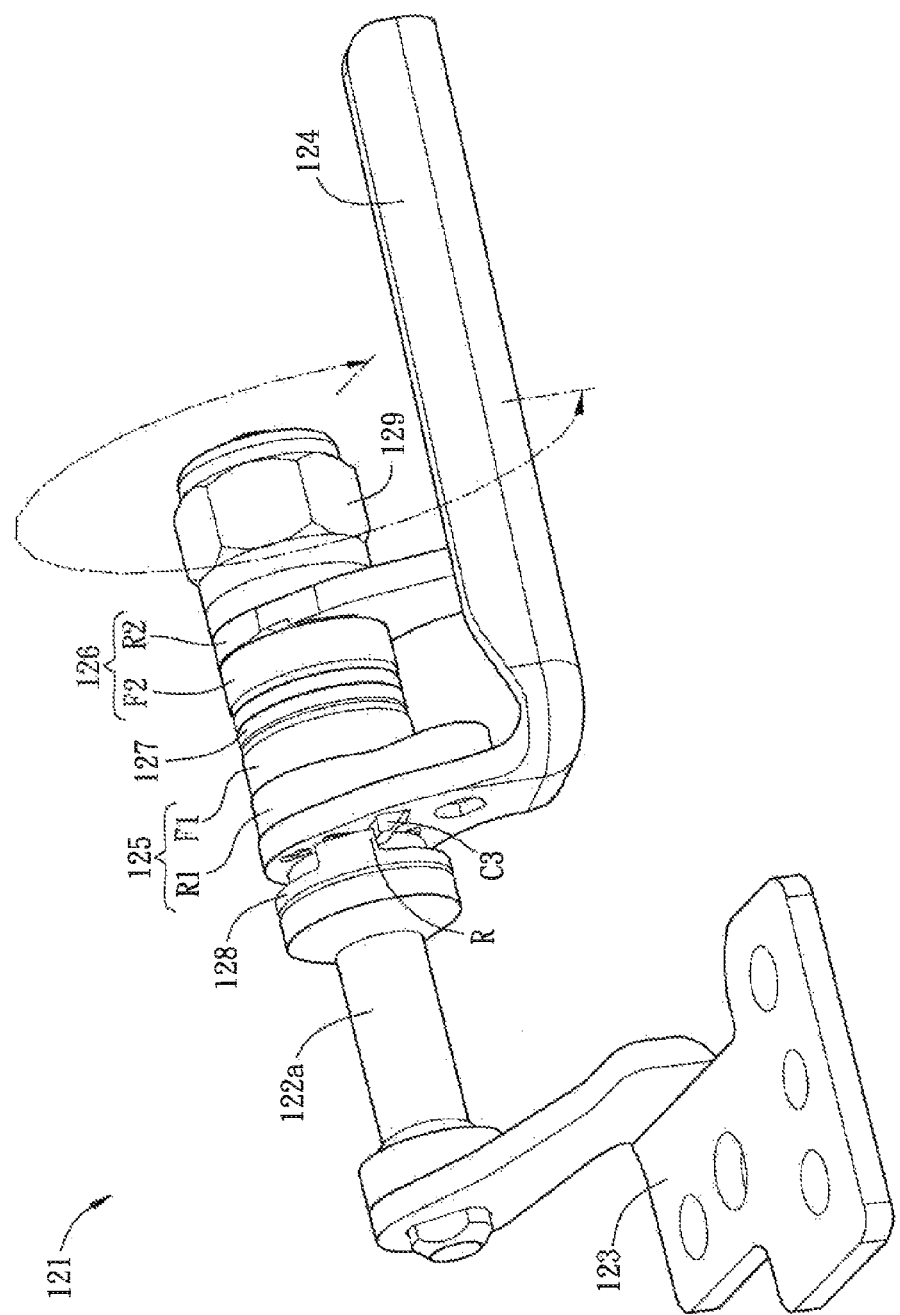
FIG. 2D is a schematic diagram of the hinge assembly of FIG. 2C.

FIG. 2C is another side view of the docking station 1 of FIG. 1A, and FIG. 2D is a schematic diagram of the hinge assembly 121 of FIG. 2C.

Referring to FIGS. 2C and 2D, when the supporting member 120 (or the rotating rack 124) rotates to the largest angel with respect to the docking body 11 (or the fixed rack 123), the limiting element 128 stops the rotating rack 124. As shown in FIG. 2D, the rotating rack 124 has a protrusion portion C3, and the limiting element 128 has a stopping portion R. When the supporting member 120 (or the rotating rack 124) rotates to the largest angel with respect to the docking body 11 (or the fixed rack 123), the stopping portion R stops the rotating rack 124 so as to limit the rotation angle of the rotating rack 124 within a maximum allowed angle. Herein, the maximum allowed angle of the rotating rack 124 is 295 degrees. Of course, it is possible to design the proper maximum allowed angle based on the requirements.

Figure 2E:
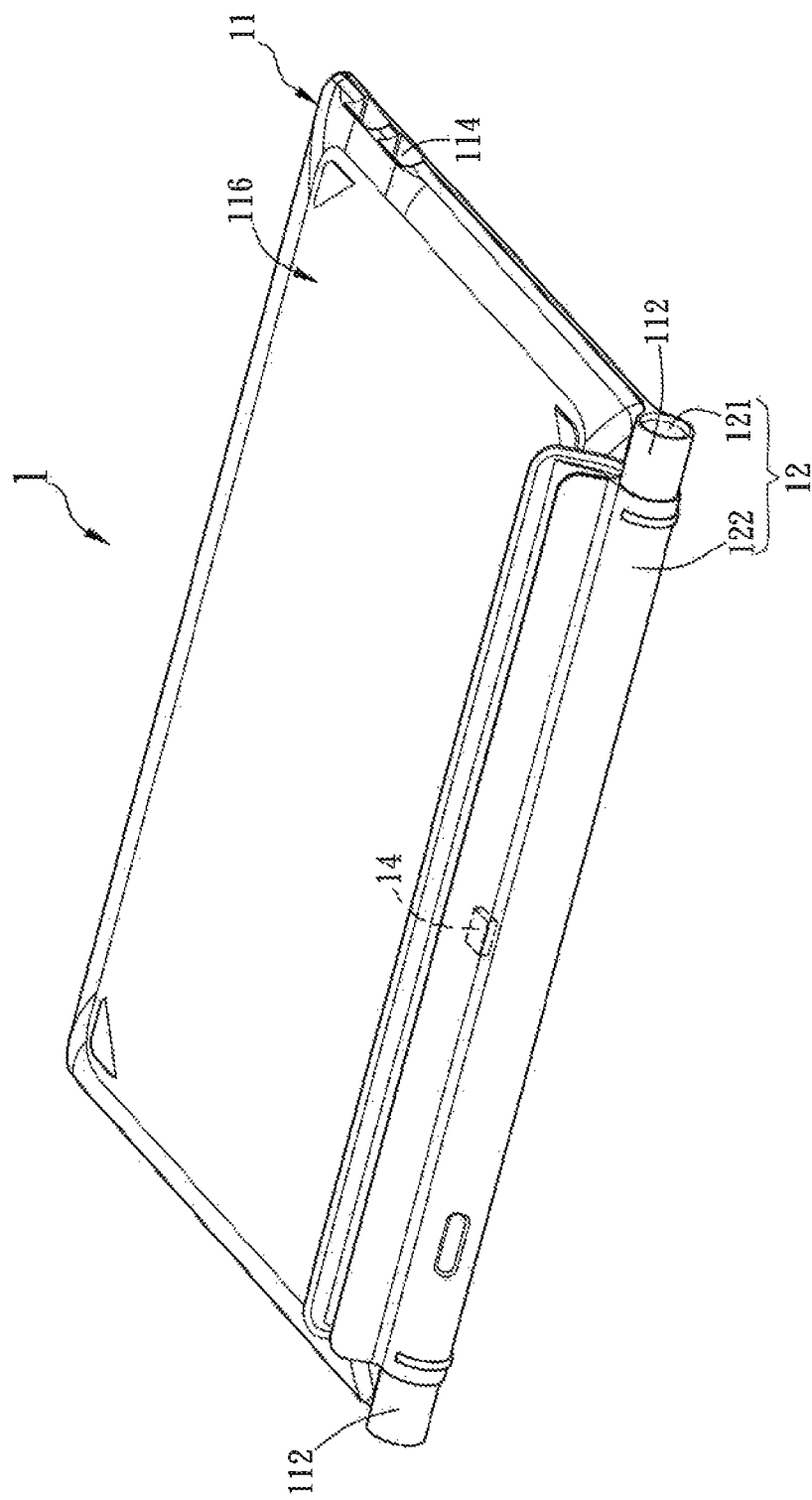
FIG. 2E is another schematic diagram of the docking station of the invention.

With reference to FIG. 2E, when the supporting member 120 is rotated to the rear side of the docking body 11 (the rotation angle exceeds 180 degrees), the docking body 11 can serve as a base standing on a table. In addition, when the docking station 1 serves as a base and is positioned reversely (the operation interface 111 is disposed on top of the supporting member 120), the supporting member 120 can serve as a stand for lifting the docking station 1. In other embodiments, the docking station 1 may further have a wireless transmission function, so that the docking station 1 can be used as an independent wireless remote controller for, for example, controlling the digital equipment in the house.

However, when the docking station 1 serves as a base standing on the table, the button B of the operation interface 111 of the docking body 11 may be pressed by the table and thus generate undesired signals. In order to avoid this problem, the docking station 1 further comprises a gravity sensing element 13 disposed inside the docking body 11 as shown in FIG. 2C. When the docking body 11 is turned over and the operation interface 111 faces downwardly, the gravity sensing element 13 is triggered to output a shutdown signal to the docking body 11 for turning off the function of the operation interface 111. Thus, the undesired signals generated by the docking station 1 as the button B is pressed by the table can be prevented. In this case, the gravity sensing element 13 is a G sensor, such as a gyroscope.

Moreover, the docking station 1 may further include a sensing element (not shown) disposed on a side wall of the docking body 11. When the rotation angle θ of the supporting member 120 with respect to the docking body 11 reaches the maximum allowed angle (295 degrees), the supporting member 120 contacts against the sensing element and automatically triggers it to turn off the function of the operation interface 111. Thus, the undesired signals generated by the docking station 1 as the button B is pressed by the table can be prevented. Herein, the sensing element can comprise an electronic sensing element, a touch sensing element, an IR sensing element, an ultrasonic sensing element, a pressure sensing element, a microload switch, or any of their combinations.

Referring to FIG. 1A again, the docking station 1 may further comprise a manual button disposed on the operation interface 111. In order to avoid the undesired press action of the button B, the user can press the manual button H to turn off the function of the button B of the operation interface 111 before rotating the supporting member 120 to the rear side of the docking body 11. Besides, the docking station 1 may further comprise an electronic connector 14 disposed in the supporting member 120 and electrically connected with the docking body 11. When the supporting member 120 rotates, the electronic connector 14 is rotated relatively. No matter how the supporting member 120 is rotated, the electronic connector 14 is always electrically connected with the docking body 11.

FIGS. 3A to 3D are several schematic diagrams of a portable apparatus 3 of the invention, wherein FIGS. 3A to 3D do not show the hinge assembly 121.

The portable apparatus 3 comprises a docking station 1 and an electronic apparatus 2, which is electrically coupled with the docking station 1.

The electronic apparatus 2 is electrically coupled with the docking station 1 by physical or non-physical electrical connection. The physical electrical connection is directly inserting the electronic apparatus 2 on the electronic connector 14. Otherwise, the non-physical electrical connection is to connect the electronic apparatus 2 with the docking station 1 by, for example, wireless communication. In the non-physical electrical connection, the docking body 11 and the electronic apparatus 2 both include a wireless transmission function. In more details, the docking station 1 may further comprise a wireless transmission module (not shown), which is disposed in the docking body 11 and electrically connected with the operation interface 111. In other words, when the operation interface 111 of the docking station 1 outputs signals, the wireless transmission module can transmit or receive wireless signals for controlling the electronic apparatus 2. For example, the wireless transmission module is a Bluetooth wireless transmission module. Accordingly, the docking station 1 of the invention can serve as an independent wireless remote controller for, for example, controlling the digital equipment in the house. The detailed description of the docking station 1 has been illustrated hereinabove, so it will be omitted here.

In this embodiment, the electronic apparatus 2 is a tablet computer, which can be directly inserted on the supporting member 120 and electrically connected with the docking station 1 through the electronic connector 14. Thus, the rotation angle of the electronic apparatus 2 with respect to the docking body 11 through the trench S can exceed 270 degrees. In other embodiments, the portable apparatus 3 can be a notebook computer or an ultrabook computer, and the electronic apparatus 2 is a display screen mounted on the docking station 1.

Figure 3A:
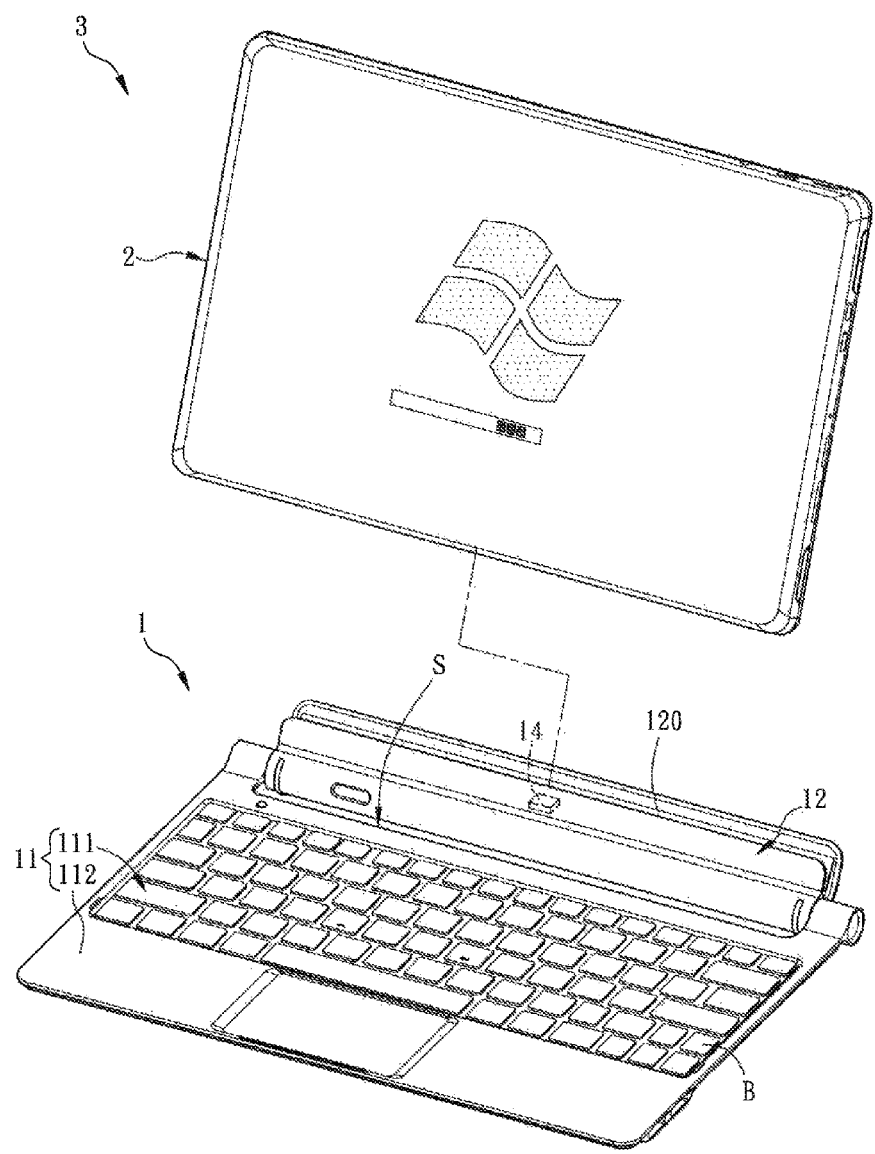
FIGS. 3A to 3D are several schematic diagrams of a portable apparatus of the invention.
Figure 3B:
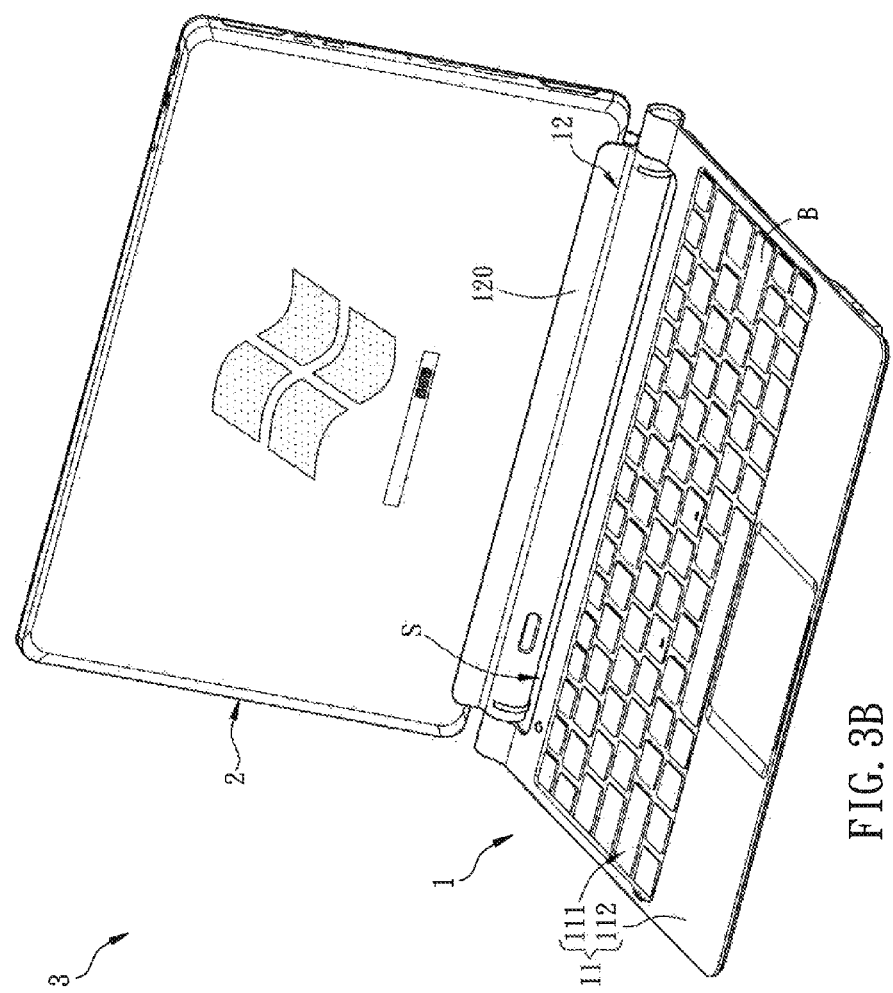

Referring to FIG. 3B, when the electronic apparatus 2 (and the supporting member 120) is rotated to the second spacing angle (e.g. 120 degrees) with respect to the docking body 11, the docking station 1 can function as a keyboard of the electronic apparatus 2 similar to the conventional notebook computer. In the portable apparatus 3, the second positioning cam set 126 (not shown in FIG. 3B) of the hinge assembly 121 of the hinge structure 12 allows the electronic apparatus 2 to have the second spacing angle and then be auto locked (e.g. when the rotation angle is 120 degrees), thereby preventing the tilt of the portable apparatus 3 caused by the excess rotation angle of the electronic apparatus 2.

Figure 3C:
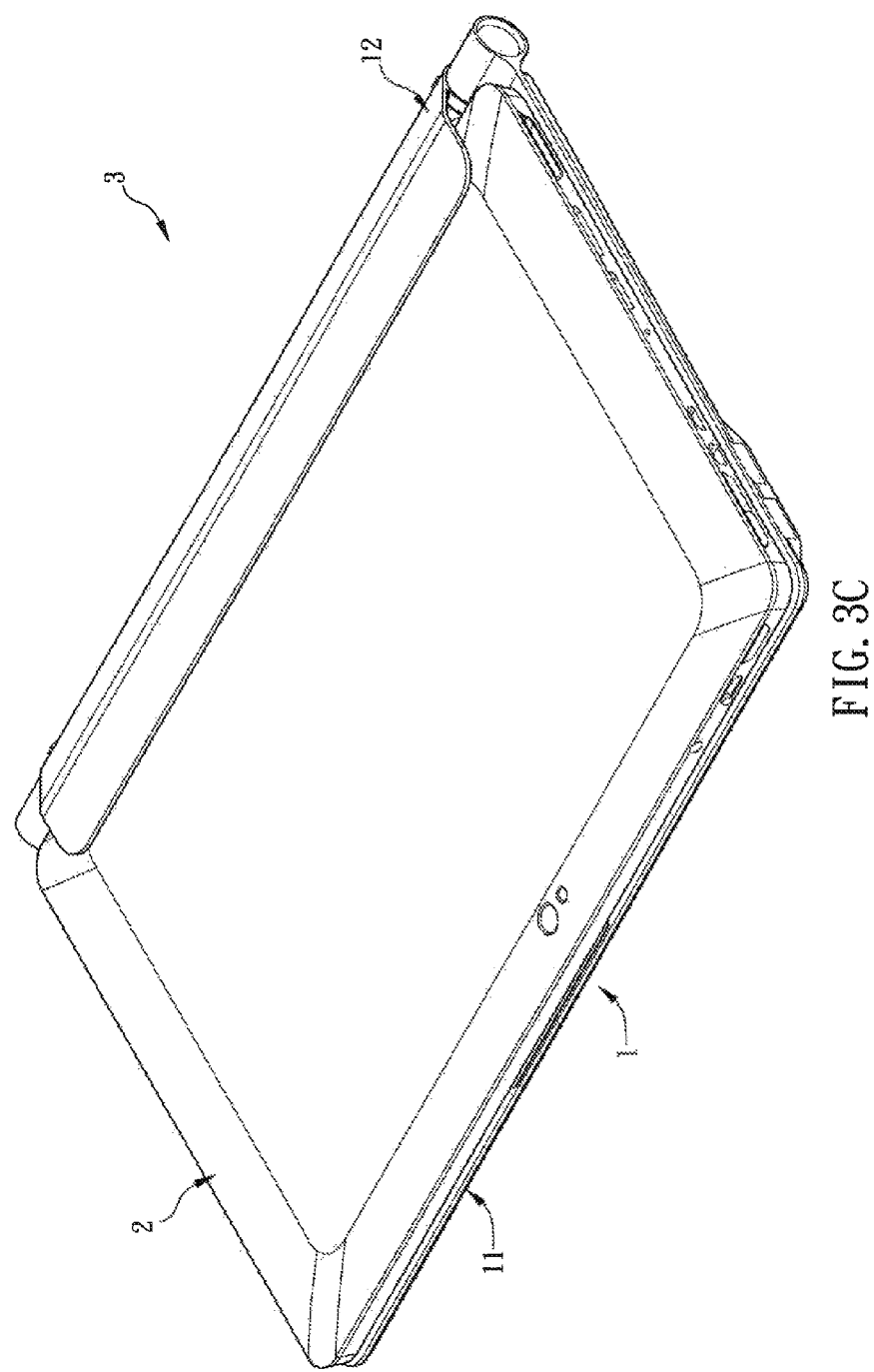

As shown in FIG. 3C, the electronic apparatus 2 can be unfolded with respect to the docking station 1 for storage. Herein, the first positioning cam set 125 (not shown in FIG. 3C) of the hinge assembly 121 of the hinge structure 12 allows the electronic apparatus 2 to have the first spacing angle and then be auto locked (e.g. when the rotation angle is 0 degrees). Thus, the docking station 1 and the electronic apparatus 2 can be unfolded and stored as a conventional notebook computer.

Figure 3D:
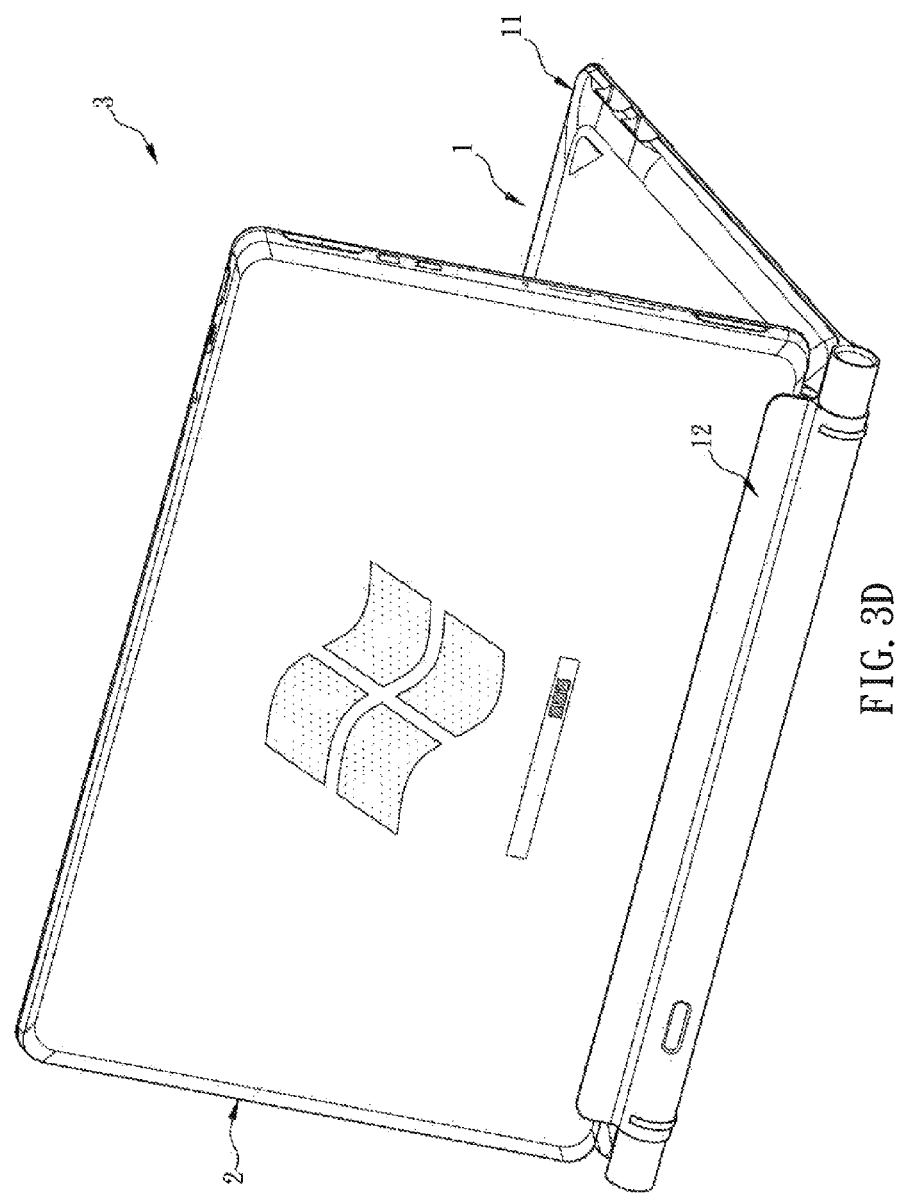

As shown in FIG. 3D, the electronic apparatus 2 is a tablet computer. The electronic apparatus 2 can be rotated to the maximum allowed angle (295 degrees) with respect to the docking body 11, and the docking body 11 serves as the support base of the electronic apparatus 2. In this configuration, the function of the button B on the operation interface 111 of the docking station 1 is turned off, thereby preventing the undesired signal from the button B. This configuration can not only enhance the stability in operating the electronic apparatus 2 (a tablet computer), but also have more spaces to operate the electronic apparatus 2 since the docking station 1 is arranged behind the electronic apparatus 2. Moreover, when the docking station 1 serves as the support base of the electronic apparatus 2 and is disposed on the table, the hinge structure 12 directly contacts the table so as to prevent the electronic apparatus 2 from unbalance and tilting.

In summary, the docking station of the invention comprises a docking body and a hinge structure. The docking body comprises a casing having an articulated portion and an operation interface disposed at the casing. The hinge structure is connected with the docking body vertiginously and comprises at least a hinge assembly and a pivot portion. The hinge assembly includes a pivot, a fixed rack, a rotating rack, a first positioning cam set and a second positioning cam set. The pivot is connected with the pivot portion, while the pivot portion is articulated with the articulated portion. One end of the pivot is connected with the fixed rack. The fixed rack is connected with the docking body. The rotating rack is rotatable relative to the fixed rack and has a first spacing angle by the first positioning cam set and a second spacing angle by the second positioning cam set. Accordingly, the portable apparatus of the invention has an auto lock function as the display screen is rotated over a certain angle, thereby preventing the tilt of the portable apparatus caused by the excess rotation angle of the screen.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A docking station, comprising:
a docking body comprising an operation interface and a casing, wherein the operation interface is disposed at the casing, and the casing has an articulated portion; and
a hinge structure connected with the docking body vertiginously and comprising at least a hinge assembly and a pivot portion, wherein the hinge assembly comprises a pivot, a fixed rack, a rotating rack, a first positioning cam set and a second positioning cam set, the pivot is connected with the pivot portion, the pivot portion is articulated with the articulated portion, one end of the pivot is connected with the fixed rack, and the fixed rack is connected with the docking body;
wherein, the rotating rack is rotatable relative to the fixed rack and has a first spacing angle by the first positioning cam set and a second spacing angle by the second positioning cam set,
wherein the hinge assembly further comprises a limiting element disposed adjacent to the rotating rack and fixed to the pivot, and when the rotating rack rotates to the largest angle with respect to the fixed rack, the limiting element stops the rotating rack, and the rotating rack has a protrusion portion, the limiting element has a stopping portion, and when the rotating rack rotates to the largest angle with respect to the fixed rack, the stopping portion stops the protrusion portion.

2. The docking station of claim 1, wherein the first positioning cam set has a first fixed portion connected with the pivot and a first rotating portion connected with the rotating rack.

3. The docking station of claim 2, wherein the rotating rack has the first spacing angle with respect to the fixed rack by a concave-protrusion configuration of the first fixed portion and the first rotating portion.

4. The docking station of claim 1, wherein the second positioning cam set has a second fixed portion connected with the pivot and a second rotating portion connected with the rotating rack.

5. The docking station of claim 4, wherein the rotating rack has the second spacing angle with respect to the fixed rack by a concave-protrusion configuration of the second fixed portion and the second rotating portion.

6. The docking station of claim 1, wherein the first spacing angle is 0 degree, and the second spacing angle is between 110 and 130 degrees.

7. The docking station of claim 1, wherein the hinge assembly further comprises an elastic element disposed between the first positioning cam set and the second positioning cam set.

8. The docking station of claim 1, wherein the largest angle of the rotating rack with respect to the fixed rack is 295 degrees.

9. The docking station of claim 1, further comprising:
a gravity sensing element disposed inside the docking body, wherein when the rotating rack rotates with respect to the fixed rack, the gravity sensing element is triggered to output a shutdown signal for turning off the function of the operation interface.

10. The docking station of claim 1, wherein the hinge structure further comprises a supporting member disposed at the pivot portion and connected with the rotating rack, the supporting member and the docking body form a trench, the supporting member is configured for supporting an electronic device, and the rotatable range of the trench with respect to the docking body exceeds 270 degrees until contacting against the docking body.

11. The docking station of claim 10, wherein when the rotating rack rotates with respect to the fixed rack, the supporting member is carried to rotate with respect to the docking body.

12. The docking station of claim 10, further comprising:
an electrical connector disposed at the supporting member, wherein when the supporting member supports the electronic device, the electronic device is electrically connected with the electrical connector so as to electrically connecting to the operation interface.

13. A portable apparatus, comprising: a docking station comprising
a docking body and a hinge structure, wherein the docking body comprises an operation interface and a casing, the operation interface is disposed at the casing, the casing has an articulated portion, the hinge structure is connected with the docking body vertiginously and comprises at least a hinge assembly and a pivot portion, the hinge assembly comprises a pivot, a fixed rack, a rotating rack, a first positioning cam set and a second positioning cam set, the pivot is connected with the pivot portion, the pivot portion is articulated with the articulated portion, one end of the pivot is connected with the fixed rack, the fixed rack is connected with the docking body, and the rotating rack is rotatable relative to the fixed rack and has a first spacing angle by the first positioning cam set and a second spacing angle by the second positioning cam set; and
an electronic device disposed at the hinge structure and electrically connected with the operation interface,
wherein the hinge assembly further comprises a limiting element disposed adjacent to the rotating rack and fixed to the pivot, and when the rotating rack rotates to the largest angel with respect to the fixed rack, the limiting element stops the rotating rack, and the rotating rack has a protrusion portion, the limiting element has a stopping portion, and when the rotating rack rotates to the largest angle with respect to the fixed rack, the stopping portion stops the protrusion portion.

14. The portable apparatus of claim 13, wherein the electronic device is detachably disposed at the hinge structure.

15. The portable apparatus of claim 13, wherein the first positioning cam set has a first fixed portion connected with the pivot and a first rotating portion connected with the rotating rack.

16. The portable apparatus of claim 15, wherein the rotating rack has the first spacing angle with respect to the fixed rack by a concave-protrusion configuration of the first fixed portion and the first rotating portion.

17. The portable apparatus of claim 13, wherein the second positioning cam set has a second fixed portion connected with the pivot and a second rotating portion connected with the rotating rack.

18. The portable apparatus of claim 17, wherein the rotating rack has the second spacing angle with respect to the fixed rack by a concave-protrusion configuration of the second fixed portion and the second rotating portion.

19. The portable apparatus of claim 13, wherein the first spacing angle is 0 degree, and the second spacing angle is between 110 and 130 degrees.

20. The portable apparatus of claim 13, wherein the hinge assembly further comprises an elastic element disposed between the first positioning cam set and the second positioning cam set.

21. The portable apparatus of claim 13, wherein the largest angle of the rotating rack with respect to the fixed rack is 295 degrees.

22. The portable apparatus of claim 13, wherein the docking station further comprises a gravity sensing element disposed inside the docking body, and when the rotating rack rotates with respect to the fixed rack, the gravity sensing element is triggered to output a shutdown signal for turning off the function of the operation interface.

23. The portable apparatus of claim 13, wherein the hinge structure further comprises a supporting member disposed at the pivot portion and connected with the rotating rack, the supporting member and the docking body form a trench, the supporting member is configured for supporting an electronic device, and the rotatable range of the trench with respect to the docking body exceeds 270 degrees until contacting against the docking body.

24. The portable apparatus of claim 23, wherein when the rotating rack rotates with respect to the fixed rack, the supporting member is carried to rotate with respect to the docking body.

25. The portable apparatus of claim 23, wherein the docking station further comprises an electrical connector disposed at the supporting member, and when the supporting member supports the electronic device, the electronic device is electrically connected with the electrical connector so as to electrically connecting to the operation interface.

* * * * *